US012572664B2

(12) United States Patent
Vijay et al.

(10) Patent No.: US 12,572,664 B2
(45) Date of Patent: Mar. 10, 2026

(54) USING ARTIFICIAL INTELLIGENCE (AI) ANALYSIS FOR IDENTIFYING POTENTIAL VULNERABILITIES INSERTED INTO SOFTWARE

(71) Applicant: MICRO FOCUS LLC, Santa Clara, CA (US)

(72) Inventors: Neeraj Kumar Vijay, Bangalore (IN); Michael F. Angelo, Houston, TX (US); Douglas Max Grover, Rigby, ID (US)

(73) Assignee: Micro Focus LLC, Santa Clara, CA (US)

( * ) Notice: Subject to any disclaimer, the term of this patent is extended or adjusted under 35 U.S.C. 154(b) by 96 days.

(21) Appl. No.: 18/475,518

(22) Filed: Sep. 27, 2023

(65) Prior Publication Data

US 2025/0103726 A1     Mar. 27, 2025

(51) Int. Cl.
  *G06F 21/57*       (2013.01)
  *G06N 5/022*       (2023.01)
(52) U.S. Cl.
  CPC ........... *G06F 21/577* (2013.01); *G06N 5/022* (2013.01); *G06F 2221/033* (2013.01)
(58) Field of Classification Search
  CPC .. G06F 21/577; G06F 2221/033; G06N 5/022
  See application file for complete search history.

(56) References Cited

U.S. PATENT DOCUMENTS

| | | | | |
|---|---|---|---|---|
| 8,015,554 B2 * | 9/2011 | Varma | ...................... | G06F 8/51 |
| | | | | 717/137 |
| 8,271,955 B1 * | 9/2012 | Lindahl | ............... | G06F 11/3636 |
| | | | | 714/45 |
| 9,170,919 B2 * | 10/2015 | Shim | ................... | G06F 11/3624 |
| 9,317,263 B2 * | 4/2016 | Chee | ......................... | G06F 8/44 |
| 10,346,287 B1 * | 7/2019 | Dillon | .................. | G06F 11/362 |
| 10,776,487 B2 | 9/2020 | Tora | | |
| 10,983,771 B1 * | 4/2021 | Hegarty | ................. | G06F 8/437 |
| 11,847,436 B2 * | 12/2023 | Strenski | ................... | G06F 8/41 |

(Continued)

OTHER PUBLICATIONS

Thompson, "Reflections On Trusting Trust"; Turing Award Lecture; Communications of the ACM; vol. 27, No. 8; Aug. 1984; 3 pages.

*Primary Examiner* — Douglas M Slachta
(74) *Attorney, Agent, or Firm* — Sheridan Ross P.C.

(57)          ABSTRACT

A current software tool is identified. The current software tool is used to manage and/or create a current corresponding software. For example, the current software tool may be a compiler and the current corresponding software may be a binary executable. A current mapping is generated between code provided to the current software tool and the current corresponding software using a first Artificial Intelligence (AI) algorithm. A comparison between the current mapping and a learned mapping is made to determine if the current software tool is manipulating the current corresponding software in an abnormal way. The learned mapping is based on historical code input into historical software tools and corresponding historical code output from the historical software tools. In response to determining that the current software tool is manipulating the current corresponding software in an abnormal way, the current software tool is identified as being compromised or likely compromised.

20 Claims, 6 Drawing Sheets

(56)  References Cited

U.S. PATENT DOCUMENTS

| | | | |
|---|---|---|---|
| 2007/0168992 A1* | 7/2007 | Bates | G06F 11/3644 |
| | | | 717/128 |
| 2007/0226708 A1* | 9/2007 | Varma | G06F 8/51 |
| | | | 717/139 |
| 2015/0199261 A1* | 7/2015 | Paveza | G06F 11/362 |
| | | | 717/124 |
| 2016/0291942 A1* | 10/2016 | Hutchison | G06F 8/311 |
| 2019/0171459 A1* | 6/2019 | Nakagawa | G06F 11/3072 |
| 2020/0301809 A1* | 9/2020 | Mola | G06F 11/3461 |
| 2022/0207150 A1* | 6/2022 | Britton | G06F 8/71 |
| 2023/0185915 A1 | 6/2023 | Rao | |
| 2023/0236813 A1* | 7/2023 | Strenski | G06F 8/447 |
| | | | 717/137 |
| 2024/0106851 A1* | 3/2024 | Kennedy | G06F 3/0482 |
| 2025/0061207 A1* | 2/2025 | Jordan | G06F 21/577 |

* cited by examiner

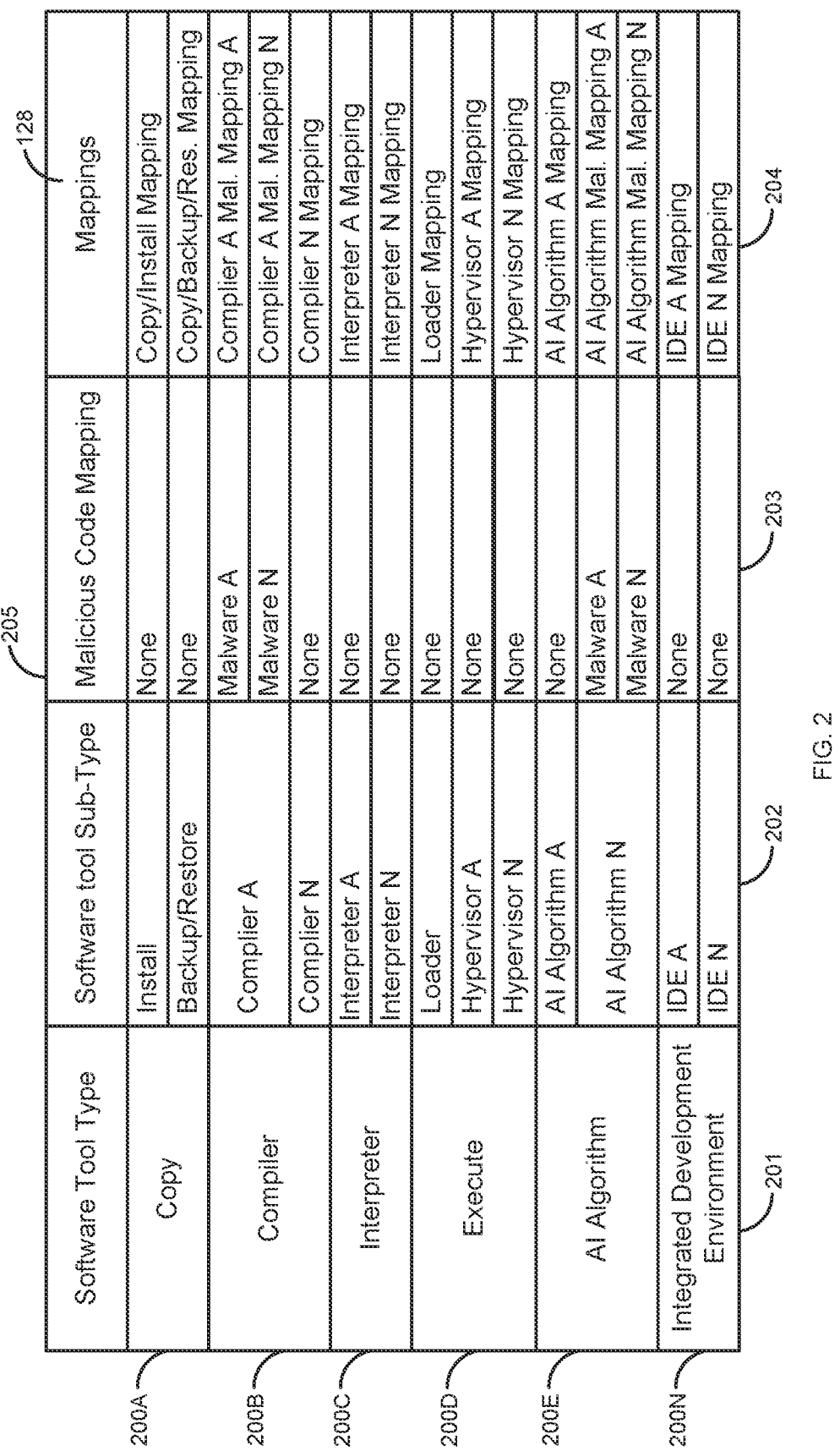

| Software Tool Type | Software tool Sub-Type | Malicious Code Mapping | Mappings |
|---|---|---|---|
| Copy | Install | None | Copy/Install Mapping |
| | Backup/Restore | None | Copy/Backup/Res. Mapping |
| Compiler | Compiler A | Malware A | Compiler A Mal. Mapping A |
| | | Malware N | Compiler A Mal. Mapping N |
| | Compiler N | None | Compiler N Mapping |
| Interpreter | Interpreter A | None | Interpreter A Mapping |
| | Interpreter N | None | Interpreter N Mapping |
| Execute | Loader | None | Loader Mapping |
| | Hypervisor A | None | Hypervisor A Mapping |
| | Hypervisor N | None | Hypervisor N Mapping |
| AI Algorithm | AI Algorithm A | None | AI Algorithm A Mapping |
| | AI Algorithm N | Malware A | AI Algorithm Mal. Mapping A |
| | | Malware N | AI Algorithm Mal. Mapping N |
| Integrated Development Environment | IDE A | None | IDE A Mapping |
| | IDE N | None | IDE N Mapping |

FIG. 2

From Step 304

600

Determine a Type and/or Sub-Type of
the Current Software Tool

602

Identify Malicious Code Mapping(s)

604

Select the Learned Mapping(s) from a
Plurality of Mappings based on the
Type, Sub-Type, and/or Malicious Code
Mapping of the Current Software Tool To Step 306

USING ARTIFICIAL INTELLIGENCE (AI) ANALYSIS FOR IDENTIFYING POTENTIAL VULNERABILITIES INSERTED INTO SOFTWARE

FIELD

The disclosure relates generally to software security and particularly to protecting malicious code from being inserted into software via tools into code and/or executables.

BACKGROUND

Attacks can occur in various places in computer software. One primary focus is to look at the source code/open-source code to identify malware/defects that are in the source code. However, other attacks may still occur where the initial source code may not contain malware/defects.

SUMMARY

These and other needs are addressed by the various embodiments and configurations of the present disclosure. The present disclosure can provide a number of advantages depending on the particular configuration. These and other advantages will be apparent from the disclosure contained herein.

A current software tool is identified. The current software tool is used to manage and/or create a current corresponding software. For example, the current software tool may be a compiler and the current corresponding software may be a binary executable. A current mapping is generated between code provided to the current software tool and the current corresponding software using a first Artificial Intelligence (AI) algorithm. The current mapping is a mapping of instructions. A comparison between the current mapping and a learned mapping is made to determine if the current software tool is manipulating the current corresponding software in an abnormal way. The learned mapping is based on historical code input into historical software tools and corresponding historical code output from the historical software tools. In response to determining that the current software tool is manipulating the current corresponding software in an abnormal way, the current software tool is identified as being compromised or likely compromised.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As defined herein and in the claims, a "software tool" is a software program used to manage/create a software program, such as a compiler, a Java Virtual Machine (JVM), a code interpreter, an Integrated Development Environment (IDE), a backup restore system, a loader, a hypervisor, an install program, an operating system, an Artificial Intelligence (AI) algorithm, and/or the like.

As defined herein and in the claims, the term "corresponding software" describes code that is either generated (e.g., a compiler generates a binary file (the corresponding software) or managed by a software tool. For example, a Java Virtual Machine (an interpreter) takes Java code and interprets it in real-time, to produce a corresponding software (i.e., interpreter code). Another examples include an Integrated Development Environment (IDE) where the IDE produces source code based on a user using the IDE to create a graphical user interface/objects, a backup restore system (e.g., takes a binary and the restores the binary), a loader (e.g., takes a binary and then loads the binary), a hypervisor (e.g., takes a container image and loads a container image), an install program (takes a copy of a binary and then copies then binary file), an operating system (e.g., loads a binary file), an Artificial Intelligence (AI) algorithm that generates source code, a compiler that takes source code and then creates a binary executable file, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 2 is a diagram of an exemplary database table that comprises different types of mapping for different types of software tools.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
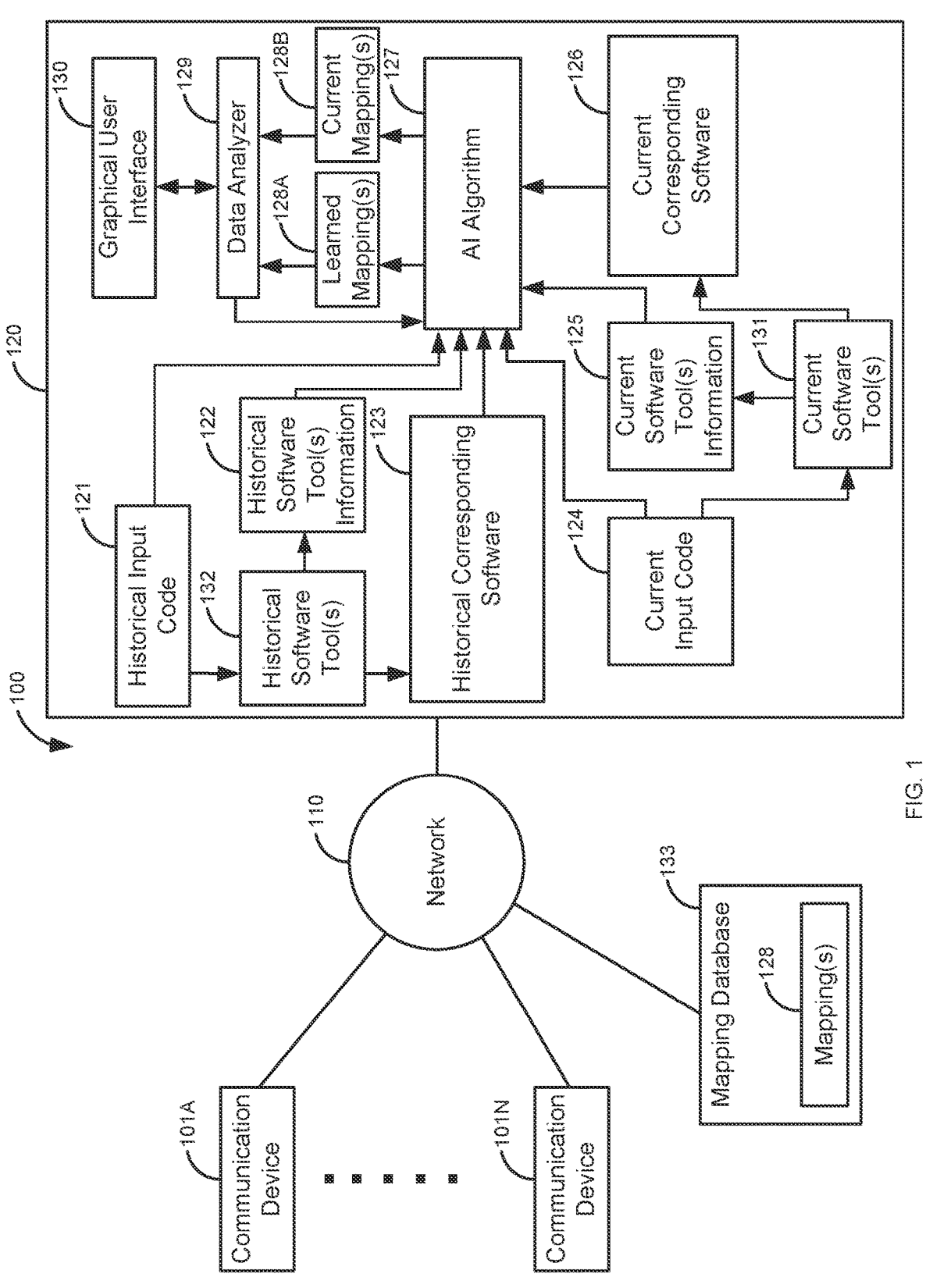
FIG. 1 is a block diagram of a first illustrative system for using Artificial Intelligence (AI) analysis for identifying potential vulnerabilities inserted into code.

FIG. 1 is a block diagram of a first illustrative system 100 for using Artificial Intelligence (AI) analysis for identifying potential vulnerabilities inserted into code. The first illustrative system 100 comprises communication devices 101A-101N, a network 110, a computing device 120, and a mapping database 132.

The communication devices 101A-101N can be or may include any user device that can communicate on the network 110, such as a Personal Computer (PC), a cellular telephone, a Personal Digital Assistant (PDA), a tablet device, a notebook device, a smartphone, and/or the like. As shown in FIG. 1, any number of communication devices 101A-101N may be connected to the network 110, including only a single communication device 101. The communication devices 101A-101N are used by users/software developers who are using the current software tool(s) 131.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The computing device 120 can be or may include any hardware coupled with software that can monitor the current software tool(s) 131 for abnormal behavior. In FIG. 1, the computing device 120 may be a communication device 101. The computing device 120 comprises historical input code 121, historical software tool(s) information 122, historical corresponding software 123, current input code 124, current software tool(s) information 125, current corresponding software 126, an AI algorithm 127, learned mapping(s) 128A, current mappings 128B, a data analyzer 129, a graphical user interface 130, current software tool(s) 131, and historical software tool(s) 132.

The historical input code 121 is code that is used to train the AI algorithm 127. The historical input code 121 may comprise different types of code, such as Java code, C code, C++ code, shell script code, Python code, binary code, and/or the like.

The historical software tool(s) information 122 may be any information associated with the historical software tool(s) 132. The historical software tool(s) information 122 may comprise information about the historical software tool(s) 132, such as a tool type (e.g., a compiler, an interpreter, an install program, etc.), a size of the software tool, a hash of the software tool, and/or the like.

The historical corresponding software 123 is software that is managed/generated by the historical software tool(s) 132. The historical corresponding software 123 is used to train the AI algorithm 127.

The current input code 124 is code that is currently being used by the current software tool(s) 131. The current input code 124 can include various types of code, such as binary code, source code, shell scripts, and/or the like.

The current software tool(s) information 125 comprises information about the current software tool(s) 131. For example, the current software tool(s) information 125 may comprise a software type (e.g., a compiler, an interpreter, etc.), a hash of the current software tool 131, a description of the current software tool 131, and/or the like.

The current corresponding software 126 is software that is managed/generated by the current software tool(s) 131. The current corresponding software 126 may be in different formats, such as a binary format, code generated by an interpreter, source code, and/or the like.

The AI algorithm 127 can be or may include any AI algorithm 127 that can be used to monitor the current software tool(s) 131 to create the mappings 128. The AI algorithm 127 may use machine learning, such as supervised machine learning, unsupervised machine learning semi-supervised machine learning, reinforcement machine learning, and/or the like.

the current mappings 128B. As one of skill in the art would recognize, other mappings 128 for other software tools 131/132 may be envisioned that are not described in Table 1. Thus, table 1 is not an exclusive list of software tools 131/132 that may use the mappings 128.

TABLE 1

| Software Tool Type | Input Code | Corresponding software | Mappings |
|---|---|---|---|
| Installer | Binary/Source Code | Binary/Source Code | Same Instructions |
| Backup/Restore | Binary/Source Code | Binary/Source Code | Same Instructions |
| Compiler | Source Code | Binary | Source Code Instructions to Binary Instructions |
| Interpreter | Source Code | Interpreted Code | Source Code Instructions to Interpreter Instructions |
| Execute | Binary | Executed Binary | Binary Instructions to Executing Instructions |
| AI Algorithm | Trained Source Code/User Input | Source Code | Trained Code/User Input Instructions to Source Code Instructions |
| Integrated Development Environment | Source Code from Libraries | Source Code from Libraries/User Added Source Code | Library Source Code Instructions to Created Source Code Instructions |

The learned mapping(s) 128A/current mappings 128B are mappings 128 that are generated by the AI algorithm 127. In one embodiment, the learned mapping(s) 128A/current mappings 128B are mappings 128 between input instructions and corresponding output instructions. The instructions may be programmatic instructions (e.g., those created by a software developer, by another AI algorithm, by an IDE, etc.), computer instructions (e.g., a binary or generated interpreter code, machine code, etc.), and/or the like.

In one embodiment, the mappings 128 may be hash based mappings 128. For example, for a compiler, an individual C++ instruction may have a corresponding number of binary instruction(s). In this example, mapping would be a hash mapping of the C++ instruction to a hash mapping of the corresponding binary instruction(s). In other words, the would be a single hash of the C++ instruction and a corresponding hash of the corresponding number of binary instructions. Alternatively, in another embodiment, the mappings 128 may be based on a checksum where the checksum is used instead of a hash. The hash/check sum mappings may be based on portions of the input code 121/124 and corresponding software 123/126.

The historical input code 121, the historical software tool(s) information 122, and the historical corresponding software 123 are used to train the AI algorithm 127 to generate the learned mappings 128A. In a similar manner, the current input code 124, the current software tool(s) information 125, and the current corresponding software 126 are monitored in real-time to generate the current mappings 128B in real-time. The historical input code 121/current input code 124 and the historical corresponding software 123/current corresponding software 126 are typically different depending on the type of the historical software tool 132/current software tool 131. Table 1 shows the different types of instructions that are mapped between the input code 121/124 and the corresponding software 123/126. Table 1 is applicable to both the learned mappings 128A and For the installer and backup/restore software tools, the input code 121/124, and the corresponding software 123/126 are the same. This is because the installer and the backup/restore software tools 131/132 copy files. For these types of software tools 131/132, the input and output mappings 128 should be the same, so the mappings 128A/128B should have the same instructions. For a compiler, the input code 121/124 is source code instructions (e.g., C++ code, Cobol code, and/or the like) and the output (corresponding software 123/126) is binary instructions. For the interpreter, the input code 121/124 is source code instructions and the output (corresponding software 123/126) is interpreter instructions. For the execute software tool(s) 131/132 (e.g., a loader or hypervisor) the input code 121/124 is binary instructions and the output (corresponding software 123/126) is executed instructions (e.g., a container (e.g., a Docker image)/virtual machine that is loaded and executed by the hypervisor). For the other AI algorithm software tool(s) 131/132, the input code 121/124 is trained source code/user input instructions and the output (corresponding software 123/126) is source code instructions. For the IDE software tool(s) 131/132, the input code 121/124 is source code from library instructions and the output code (corresponding software 123/126) is source code instructions.

The data analyzer 129 is used to manage the mappings 128 created by the AI algorithm 127. For example, the data analyzer 129 can compare the learned mappings 128A to the current mappings 128B that are generated by the AI algorithm 127.

The graphical user interface 130 is used to display information about whether the current software tool(s) 131 are manipulating the current corresponding software 126 in an abnormal way. By using the graphical user interface 130, a user can be notified, in real-time, that the current software tool(s) 131 are compromised or potentially compromised. The user and/or data analyzer 129 can then take various actions to prevent unauthorized access to resources on the network 110. This improves security on the communication devices 101A-101N and/or the computing device 120. In addition, the quality/security of different releases of current corresponding software can be improved.

The current software tool(s) 131/historical software tool(s) 132 are software tools that are used to manage/ generate executable software. For example, the current software tool(s) 131/historical software tool(s) 132 may be a compiler, an installation program, a backup restore application, a loader, a hypervisor, an interpreter, another AI algorithm, an IDE, and/or the like. The historical software tool(s) 132 may comprise only the current software tool(s) 131 (e.g., the corresponding mappings 128 are generated based on the same software tool(s) 131/132), other historical software tools 132 not including the current software tool 131, a combination of these, and/or the like.

The mapping database 133 may be a networked database that contains the mappings 128. For example, the mapping database 133 may be a service provided by a third party that contains the learned mappings 128A, which can be accessed by the data analyzer 129 to compare the learned mappings 128A in the mapping database 133 to the current mapping(s) 128B on the computing device 120.

Although FIG. 1 shows where all of the elements 121-132 reside on the computing device 120, individual elements 121-132 of the computing device 120 may be distributed between the computing device 120 and the communication device 101. For example, the historical input code 121, the historical software tool(s) 132, the historical software tool(s) information 122, the historical corresponding executable application(s) 123 may reside on the computing device 120 and the current input code 124, the current software tool (s) 131, the current software tool(s) information 125, the current corresponding software 126, the AI algorithm 127, the mappings 128A/128B, the data analyzer 129, the graphical user interface 130, and the current software tool(s) 131 may reside on one or more of the communication devices 101A-101N.

FIG. 2 is a diagram of an exemplary database table 205 that comprises different types of mappings 128 for different types of software tools 131/132. Illustratively, the communication devices 101A-101N, the computing device 120, the historical input code 121, The historical software tool(s) information 122, the historical corresponding software 123, the current input code 124, the current software tool(s) information 125, the current corresponding software 126, the AI algorithm 127, the learned mapping(s) 128A, the current mapping(s) 128B, the data analyzer 129, the graphical user interface 130, the current software tool(s) 131, the historical software tool(s) 132, and the mapping database 133 are stored-program-controlled entities, such as a computer or microprocessor, which performs the method of FIGS. 2-6 and the processes described herein by executing program instructions stored in a computer readable storage medium, such as a memory (i.e., a computer memory, a hard disk, and/or the like). Although the methods described in FIGS. 2-6 are shown in a specific order, one of skill in the art would recognize that the steps in FIGS. 2-6 may be implemented in different orders and/or be implemented in a multi-threaded environment. Moreover, various steps may be omitted or added based on implementation.

In FIG. 2, the database table 205 comprises a software tool type column 201, a software tool sub-type column 202, a malicious code mapping column 203, and a mappings column 204. The software tool type column 201 defines the different types of software tools 131/132 based on the function the software tools 131/132 perform (e.g., copy, compile, interpret, execute, generate code using an AI algorithm 127/IDE, etc.). The software tool sub-type column 202 further defines the software tool type. The malicious code mapping column 203 defines if there is also a mapping that has an associated type of malware. The mapping column 204 comprises the mappings between the input code 121/124 and the corresponding software 123/126.

The mapping type 200A (copy) has an install and a backup/restore mapping software tool sub-type. For the mapping type 200A, there are no malicious code mappings that are part of mappings 128. The mappings 128 for the install/backup/restore are a copy/install mapping 128 and a backup/restore mapping 128.

The mapping type 200B (compiler) has a compiler A and a compiler N software tools sub-type. There is also a malware A and a malware N malicious code mapping for the compiler A. This means that the compiler A has an associated specific type of malware in the mappings 128 for the compiler A. For the compiler A there is a mapping A (128). Likewise, for the compiler N, there is a mapping N (128). The malware mapping 128 is a mapping 128 where the corresponding software 123/126 has instructions that have specific malicious code instructions.

The mapping type 200C (interpreter) has an interpreter A and an interpreter N software tools sub-type. For the mapping type 200C, there are no malicious code mappings that are part of mappings 128. The mappings 128 for the interpreter are interpreter A/interpreter N mappings 128.

The mapping type 200D (execute) has a loader, a hypervisor A, and a hypervisor N software tool sub-type. For the mapping type 200D, there are no malicious code mappings 128 that are part of mappings 128. For the loader/interpreter A-N, the mappings 128 are a loader mapping 128, a hypervisor A mapping 128, and a hypervisor N mapping 128.

The mapping type 200E (AI algorithm) has an AI algorithm A and an AI algorithm N software tool sub-type. For the AI algorithm A, there is not a malicious code mapping 128 that is part of the AI algorithm A mapping 128. For the AI algorithm N, there are two malware mappings 128 that are part of the mappings 128 (Malware A and Malware N). For the AI algorithm A, there is an AI algorithm A mapping 128. For the AI algorithm N, there are two mappings 128 (AI algorithm malware mapping A 128 and AI algorithm malware mapping N 128).

The mapping type 200 N (IDE) has an IDE A and an IDE N software tool sub-type. For the mapping type 200N (DE), there are no malicious code mappings 128 that are part of the mappings 128. The mappings 128 are an IDE A mapping 128 and an IDE N mapping 128.

Figure 3:
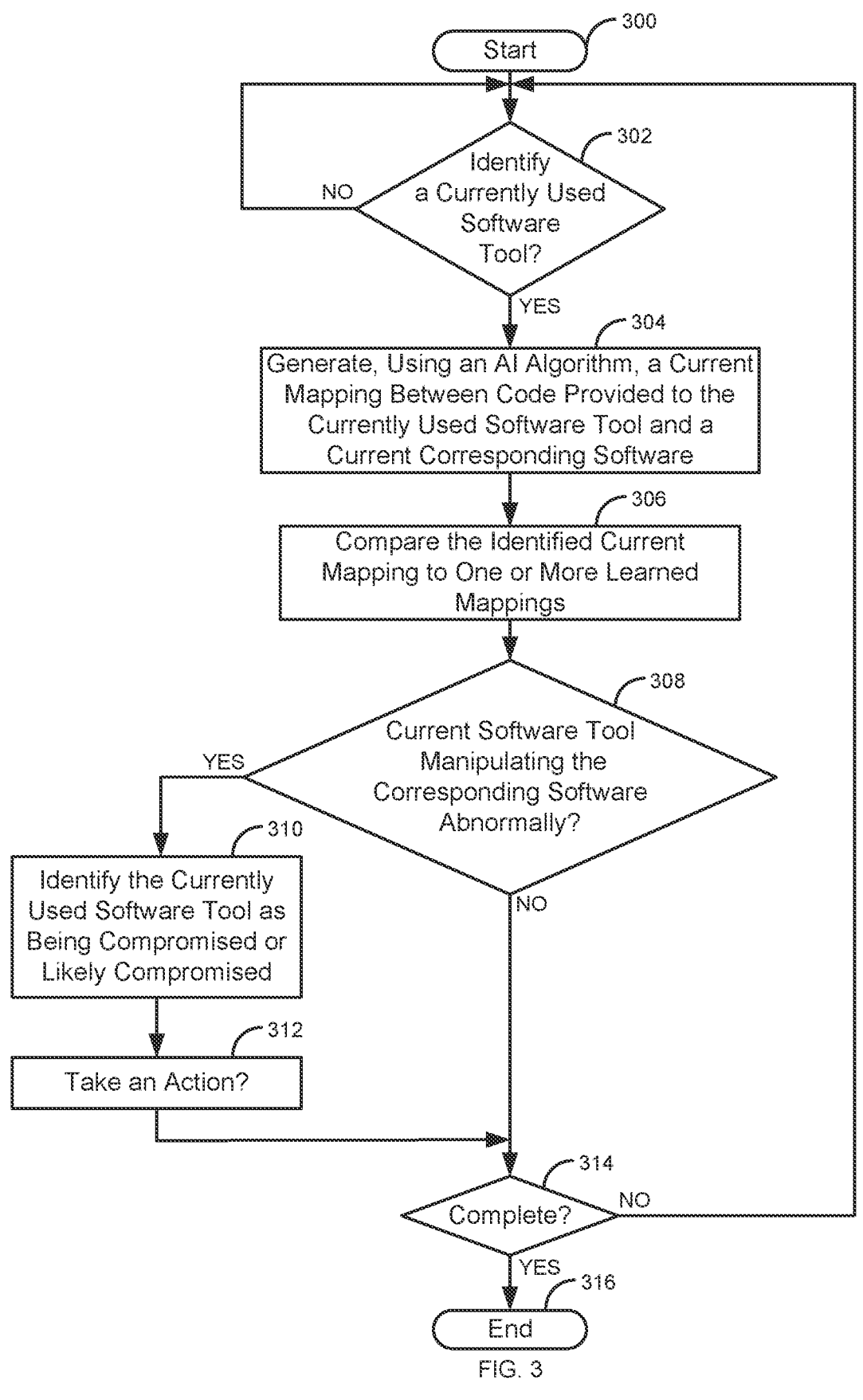
FIG. 3 is a flow diagram of a process for using AI analysis for identifying potential vulnerabilities inserted into code.

FIG. 3 is a flow diagram of a process for using AI analysis for identifying potential vulnerabilities inserted into code. The process starts in step 300. The data analyzer 129 identifies, in step 302, the currently sued software tool 131. The data analyzer 129 can identify the current software tool 131 in various ways, such as when the current software tool 131 is loaded, when the current software tool 131 is running, based on reading a configuration file, based on making an Application Programming Interface (API) call to an operating system, and/or the like.

The AI algorithm 127 generates a current mapping 128B between the current input code 124 and the current corresponding software 126 in step 304. The generation of the current mapping 128B can be an instruction mapping. For example, if the current software tool 131 is a compiler that has just compiled a C++ program, the current mapping 128B may include a mapping between the C++ instructions (e.g., a for different instructions, such as, for loops, while loops, increment, decrement, structures, etc.) and the corresponding machine instructions in the binary file for the same instructions. The data analyzer 129 compares the current mapping 128B to the learned mapping(s) 128A in step 306. The data analyzer 129 determines, in step 308, if the current software tool 131 is manipulating the current corresponding software 126 abnormally. The manipulation is based on variances in the current mapping 128B from the learned mapping(s) 128A.

For example, if the current software tool 131 is an install program that is adding malware instructions to the current corresponding software 126 when copying the current corresponding software 126, the data analyzer 129 may identify that the current software tool 131 (e.g., the installer) is inserting malicious code into the current corresponding software 126. By analyzing the source code in relation to the binary/object code, these different types of attacks can be identified.

In one embodiment, the comparison of step 306 may use a learned threshold. This can account for minor variances in the input code 121/124 and the corresponding software 123/126. In this embodiment, the AI algorithm 127 can learn over time how much the mappings 128 typically vary. This makes the system more adaptive to real-world conditions.

In addition, by having learned thresholds, false positives are reduced and the overall accuracy is increased. For example, the AI algorithm 127 may learn over time by comparing individual current instruction mappings 128B to the individual learned instructions mappings 128A where the mappings 128 comprise a series of comparisons (e.g., comparing different hash mappings 128 for specific instructions or individual instructions) to produce a learned threshold when training using historical software tools 132 that have not been compromised.

Other types of manipulation may include changing the current corresponding software 126 when copying the corresponding software 126, changing the current corresponding software 126 before executing the current corresponding software 126, removing code from the current corresponding software 126, adding a malicious function call(s) to an existing class library by an Integrated Development Environment (IDE), adding the malicious code when a new class library is created using the IDE, adding malicious code to an existing class library when creating the current corresponding software 126 with the IDE, and/or the like.

In addition, if malicious code is inserted, the specific type of attack can be learned over time. For example, the attack may be to put in a back door for a password (a hacker password), to not check for going off the end of an array, to ignore ports, to expose sensitive information, create new attack surfaces/backdoor URLs, and/or the like. The attack could be used to compromise a blockchain or other secure records. In other words, the attack may be to comprise the software that loads blocks into a blockchain.

The attack could comprise the compiler by inserting multiple different types of malicious code. The multiple attacks may be valid attacks where the hope is that the testing will not catch at least one of the issues. If the current software tool 131 is a customer's JVM all the test scripts would all pass and the JVM would only fail in the customer's environment. With this test, the process will capture the change in real-time (a real-time JVM monitor) as the JVM interprets the source code to interpreter code in the customer's environment.

If the current software tool 131 is not manipulating the current corresponding software 126 in step 308, the process goes to step 314. Otherwise, if the current software tool 131 is manipulating the current corresponding software 126 in step 308, the data analyzer 129 identifies the current software tool 131 as being compromised or likely compromised in step 310. The data analyzer 129 and/or a user can then take an action based on one or more rules in step 312. For example, the data analyzer 129 may disable the current software tool 131, remove the current software tool 131, replace the current software tool 131 (e.g., replace it with a backed-up version), remove code from the current software tool 131 (e.g., remove malware), replace code in the current software tool 131, and/or the like. The process then goes to step 314.

The data analyzer 129 determines, in step 314, if the process is complete. If the process is not complete in step 314, the process goes back to step 302. Otherwise, if the process is complete in step 314, the process ends in step 316.

Figure 4:
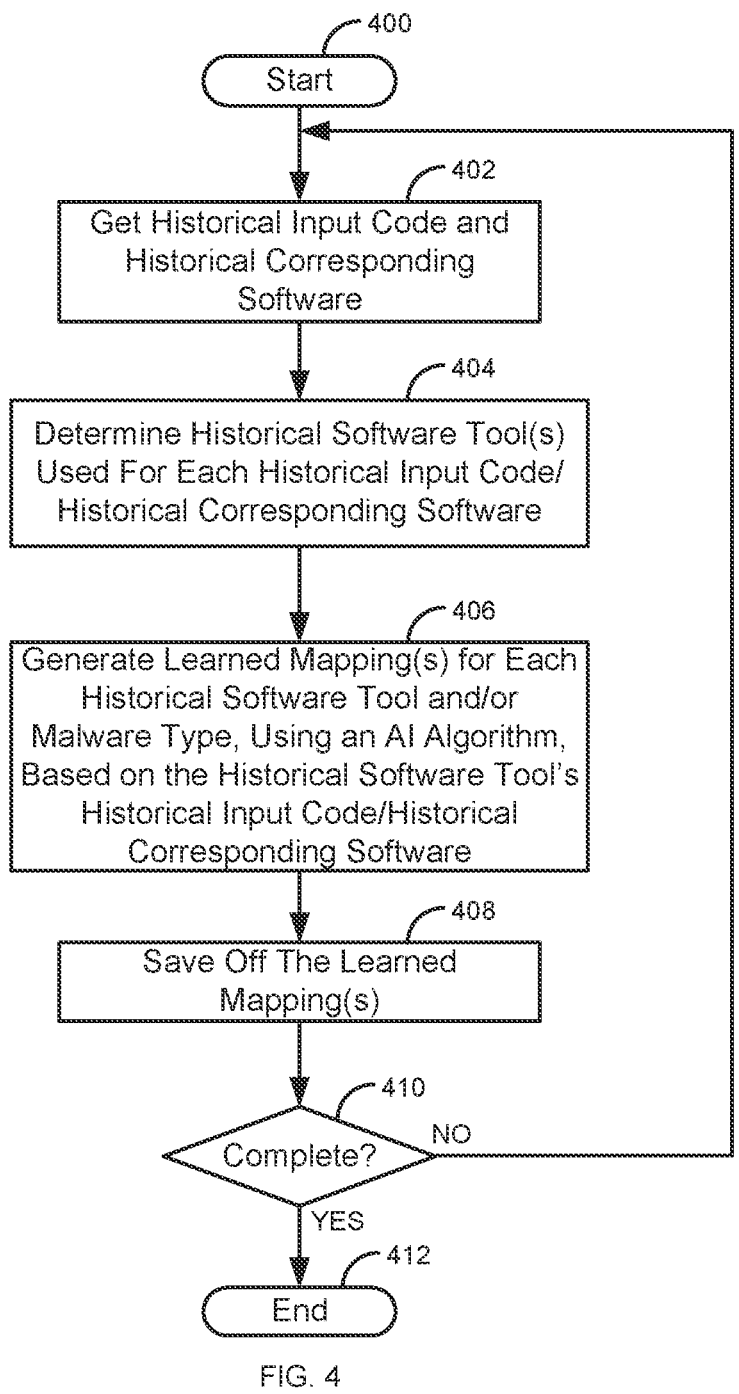
FIG. 4 is a flow diagram of a process for training an AI algorithm using historical input code/historical corresponding software for different historical software tool(s).

FIG. 4 is a flow diagram of a process for training an AI algorithm 127 using historical input code 121/historical corresponding software 123 for different historical software tool(s) 132. The process starts in step 400. The data analyzer 129 gets historical input code 121 and the historical corresponding software 123 in step 402. The data analyzer 129 determines, in step 404, the historical software tool(s) 132 used for each historical input code 121/historical corresponding software 123. The AI algorithm 127 generates, in step 406, the learned mapping(s) 128A for each historical software tool 132 and malware type (if there is one) based on the historical software tool's historical input code 121/historical corresponding software 123.

In one embodiment, the learned mapping(s) 128A may be generated on a one-to-one basis. For example, the learned mapping(s) 128A may be generated using the same software tool 131/132. Alternatively, the learned mapping(s) 128A may be generated based on a type of tool (e.g., compiler). For example, the learned mapping(s) 128A may be generated based on multiple different compilers. This could apply to different versions of the same compiler where the learned mapping(s) 128A are generated based on different versions of the same compiler.

The data analyzer 129 then saves off the learned mapping(s) 128A in step 408. The saved off learned mapping(s) 128 are then used in step 306 of FIG. 3. Alternatively, the learned mapping(s) 128A may be saved off to the mapping database 133.

The data analyzer 129 determines, in step 410, if the process is complete. If the process is not complete in step 410, the process goes back to step 402. Otherwise, if the process is complete in step 410, the process ends in step 412.

Figure 5:
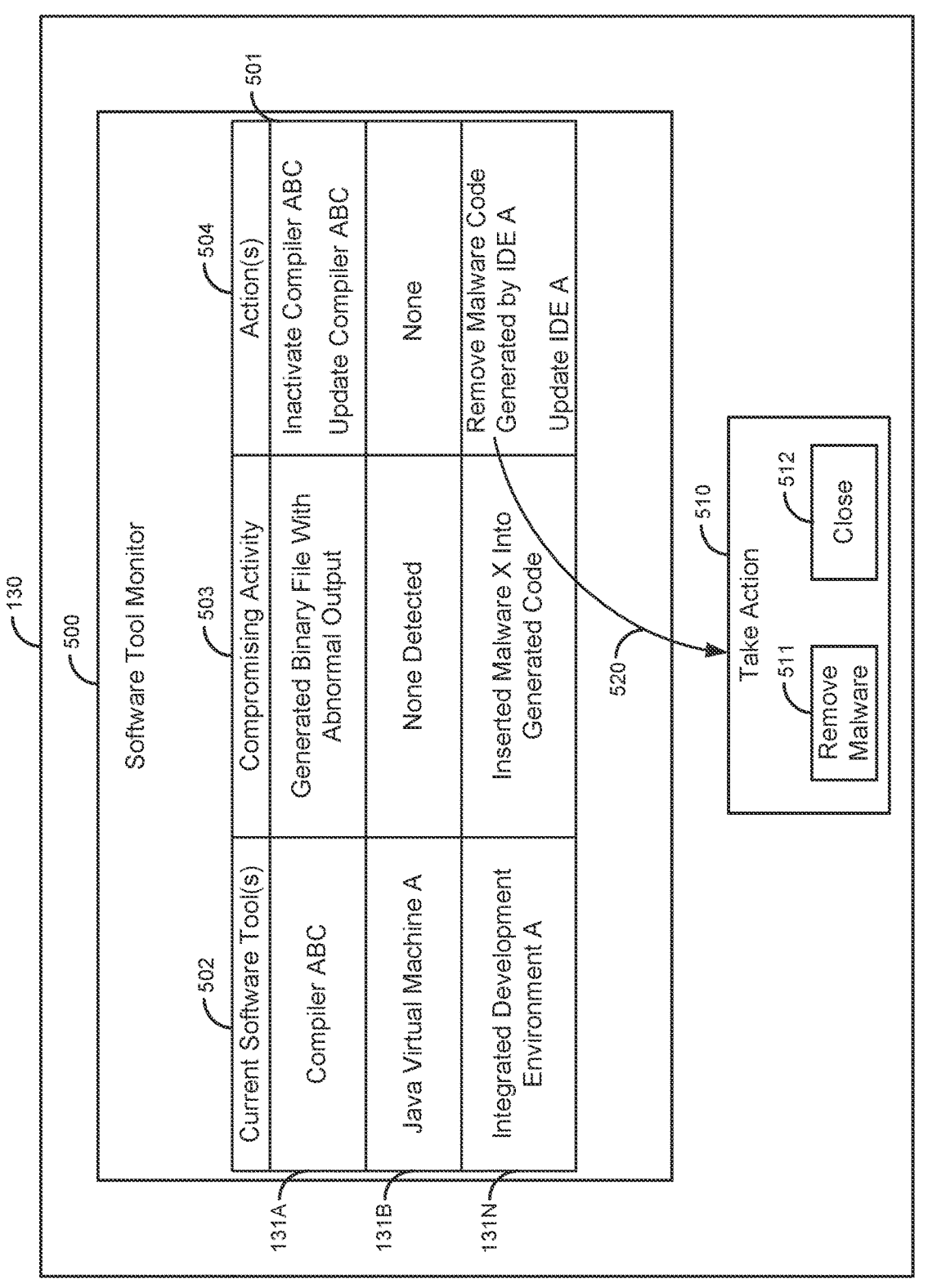
FIG. 5 is an exemplary diagram of a graphical user interface for managing current software tools that are manipulating a current corresponding software.

FIG. 5 is an exemplary diagram of a graphical user interface 130 for managing current software tool(s) 131 that are manipulating the current corresponding software 126. In FIG. 5, the graphical user interface 130 comprises a software tool monitor window 500 and an action window 510.

The software tool monitor window 500 comprises a software tool list 501. The software tool list 501 comprises a current software tool(s) column 502, a compromising activity column 503, and an action(s) column 504. The current software tool column 502 displays the names of the current software tools 131A-131N that the data analyzer 129 is monitoring.

For the current software tool 131A (compiler ABC), the compromising activity column 503 indicates that the compiler ABC 131A is generating a binary file that the AI algorithm 127 determined is abnormal based on comparing the current mapping 128B of the compiler ABC 131A to the learned mapping(s) 128A. The action(s) column 504 indicates that the user has two options: 1) to inactivate the compiler ABC 131A, and 2) to update the compiler ABC 131A. Inactivating the compiler ABC 131A means that the user will no longer able to run the compiler ABC 131A. Updating the compiler ABC 131A means that the compiler ABC is updated with a non-compromised version of the compiler ABC 131A.

For the current software tool 131B (Java Virtual Machine A), there are no identified compromising activities detected. There are also no actions to take for the Java Virtual Machine A 131B.

For the current software tool 131N (Integrated Development Environment (IDE) A), the compromising activity column 503 indicates that the IDE A 131N has inserted malware into the code generated by the IDE A 131N. The action(s) column 504 gives the user the option to: 1) remove the malware code generated by the IDE, and 2 to update the IDE A 131N. In this case, the user could do one of the actions, both of the actions, or ignore the action.

The user can click on one of the actions in the action(s) column 504. For example, as shown in FIG. 5, the user has clicked on the remove malware code generated by the IDE A in step 520. When the user clicks on the remove malware code generated by the IDE A in step 520, the take action window 510 is displayed to the user. The user can then click on the remove malware button 511 to remove the malware from the code generated by the IDE A 131N. Alternatively, the user can close the take action window by clicking on the close button 512. Likewise, the user can take similar actions by clicking on individual ones of the actions in the action(s) column 504.

Figure 6:
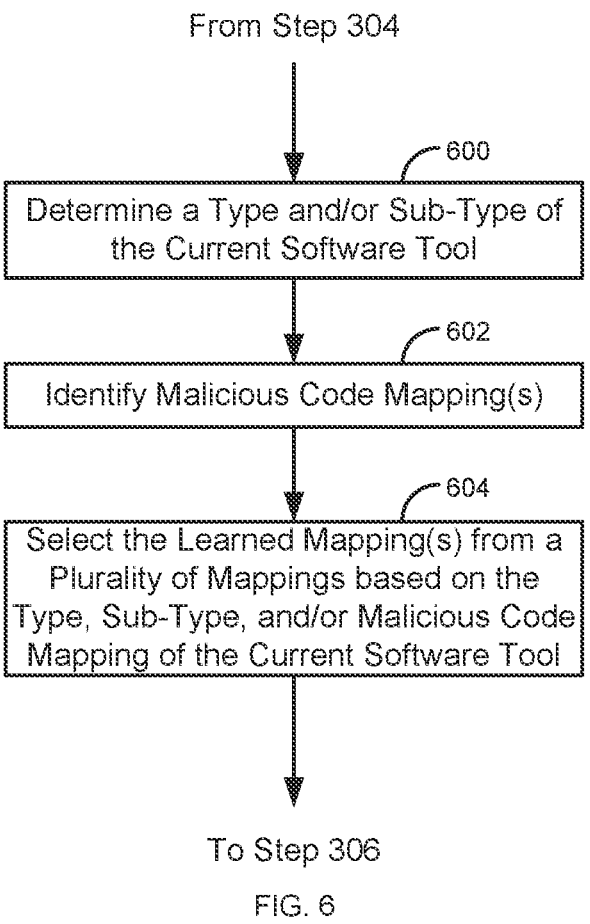
FIG. 6 is a flow diagram of a process for selecting a learned mapping.

FIG. 6 is a flow diagram of a process for selecting a learned mapping 128A. The process of FIG. 6 goes between steps 304 and 306 of FIG. 3. After generating the current mapping 128B in step 304, the data analyzer 129 determines, in step 600, a type and/or sub-type of the current software test tool 131. For example, as described in FIG. 2, the software tool type may be a copy, a compiler, an interpreter, an execute, an AI algorithm, an IDE, and/or the like. In addition, a software tool sub-type may be identified in step 600. For example, the software tool sub-type may be an install program, a backup/restore program, a type of compiler, a type of interpreter, a type of loader, a type of hypervisor, a type of AI algorithm, a type of IDE, and/or the like.

The data analyzer 129 identifies, in step 602, any malicious code mappings. For example, as shown in FIG. 2, the compiler A has a first malicious code mapping to malware A and second malicious code mapping to malware B. By identifying the correct malware instructions, the specific type of malware can be identified.

Based on the determined software tool type, sub-type, and/or malicious code mappings 128, the data analyzer 129 selects, in step 604, the learned mapping(s) 128A from a plurality of mappings 128 based on the type/sub-type/malware type of the current software tool 131. For example, the data analyzer 129 may select a learned mapping 128B from the database table 205 based on the type/sub-type/malware type of the current software test tool 131. The process then goes to step 306.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device 120.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:

a microprocessor; and a computer readable medium, coupled with the microprocessor and comprising microprocessor readable and executable instructions that, when executed by the microprocessor, cause the microprocessor to:

identify a current software tool, wherein the current software tool is used to manage and/or create a current corresponding software;

generate, using a first Artificial Intelligence (AI) algorithm, a current mapping between first code provided to the current software tool and second code of the current corresponding software;

select a learned mapping from among a plurality of learned mappings;

compare the generated current mapping to the selected learned mapping to determine if the current software tool is manipulating, by the second code, the current corresponding software in an abnormal way, wherein the selected learned mapping is based on historical code input into one or more historical software tools and historical output code of historical corresponding software from the one or more historical software tools; and in response to determining that the current software tool is manipulating the current corresponding software in the abnormal way, identify the current software tool as being compromised or likely compromised.

2. The system of claim 1, wherein the microprocessor readable and executable instructions further cause the microprocessor to:

determine a type and/or sub-type of the current software tool; and select the learned mapping from the plurality of learned mappings based on the type and/or sub-type of the current software tool.

3. The system of claim 1, wherein the learned mappings comprise a plurality of learned malicious code mappings based on a plurality of types of malicious code and wherein the microprocessor readable and executable instructions further cause the microprocessor to:

identify an individual malicious code mapping from the plurality of learned malicious code mappings.

4. The system of claim 1, wherein the generated current mapping comprises one of:

a same instructions mapping;

a source code instructions to binary code instructions mapping;

a source code instructions to interpreter code instructions mapping;

a binary code instructions to an execute instructions mapping;

a trained code and/or user input instructions to a source code instructions mapping; and a library source code instructions to a created source code instructions mapping.

5. The system of claim 1, wherein the current software tool is manipulating the current corresponding software in the abnormal way in at least one of the following ways:

by changing the current corresponding software when copying the corresponding software;

by changing the current corresponding software while compiling the current corresponding software;

by changing the current corresponding software while interpreting the current corresponding software;

by changing the current corresponding software before executing the current corresponding software;

by inserting malicious code into the current corresponding software;

by removing code from the current corresponding software;

by adding a malicious function call to an existing class library by an Integrated Development Environment (IDE);

by adding the malicious code when a new class library is created using the IDE; and by adding the malicious code to an existing class library when creating the current corresponding software with the IDE.

6. The system of claim 1, wherein the one or more historical software tools comprise one of: only the current software tool, only different versions of the current software tool, or one or more other historical software tools that do not include the current software tool.

7. The system of claim 1, wherein the current software tool is a second AI algorithm and wherein the current corresponding software is generated code.

8. The system of claim 1, wherein the current software tool is a compiler and wherein the current corresponding software is an executable binary file.

9. The system of claim 1, wherein the current software tool is an Integrated Development Environment and wherein the current corresponding software is generated code.

10. The system of claim 1, wherein the current software tool is an interpreter and wherein the current corresponding software is interpreter code.

11. The system of claim 1, wherein, in response to determining that the current software tool is manipulating the current corresponding software in the abnormal way further causes the microprocessor readable and executable instructions to cause the microprocessor to at least one of:

disable the current software tool;

remove the current software tool;

replace the current software tool;

remove code from the current software tool; and replace code in the current software tool.

12. The system of claim 1, wherein the generated current mapping and the selected learned mapping are based on one of: hashes of specific instructions and/or checksums of the specific instructions.

13. The system of claim 1, wherein comparing the generated current mapping to the selected learned mapping comprises comparing a plurality of individual current instruction mappings to a plurality of individual learned instruction mappings to determine a set of variances, wherein determining if the current software tool is manipulating the current corresponding software in the abnormal way comprises using a learned threshold, and wherein, when the set of variances have a first relationship to the learned threshold, the microprocessor determines that the current software tool is manipulating the current corresponding software in the abnormal way and, when the set o variances have a different second relationship to the learned threshold, the microprocessor determines that the current software tool is manipulating the current corresponding software in a normal way.

14. A method comprising:

identifying, by a microprocessor, a current software tool, wherein the current software tool is used to manage and/or create a current corresponding software;

generating, by the microprocessor, using a first Artificial Intelligence (AI) algorithm, a current mapping between first code provided to the current software tool and second code of the current corresponding software;

selecting a learned mapping from among a plurality of learned mappings;

comparing, by the microprocessor, the generated current mapping to the selected learned mapping to determine if the current software tool is manipulating, by the second code, the current corresponding software in an abnormal way, wherein the selected learned mapping is based on historical code input into one or more historical software tools and historical output code of historical corresponding software from the one or more historical software tools; and in response to determining that the current software tool is manipulating the current corresponding software in the abnormal way, identifying, by the microprocessor, the current software tool as being compromised or likely compromised.

15. The method of claim 14, further comprising:

determining a type and/or sub-type of the current software tool; and selecting the learned mapping from the plurality of learned mappings based on the type and/or sub-type of the current software tool.

16. The method of claim 14, wherein the plurality of learned mappings comprise a plurality of learned malicious code mappings based on a plurality of types of malicious code and further comprising:

identifying an individual malicious code mapping from the plurality of learned malicious code mappings.

17. The method of claim 14, wherein comparing the generated current mapping to the selected ;earned mapping comprises comparing a plurality of individual current instruction mappings to as plurality of individual learned instruction mappings to determine a set of variances, wherein determining if the current software tool is manipulating the current corresponding software in the abnormal way comprises using a learned threshold, the microprocessor determines that the current software tool is manipulating the current corresponding software in the abnormal way and, when the set of variances have a different second relationship to the learned threshold, the microprocessor determines that the current software tool is manipulating the current corresponding software in a normal way, and wherein the generated current mapping comprises one of:

a same instructions mapping;

a source code instructions to binary code instructions mapping;

a source code instructions to interpreter code instructions mapping;

a binary code instructions to an execute instructions mapping;

a trained code and/or user input instructions to a source code instructions mapping; and a library source code instructions to a created source code instructions mapping.

18. The method of claim 14, wherein, in response to determining that the current software tool is manipulating the current corresponding software in the abnormal way further comprises at least one of:

disabling the current software tool;

removing the current software tool;

replacing the current software tool;

removing code from the current software tool; and replacing code in the current software tool.

19. The method of claim 14, wherein the generated current mapping and the selected learned mapping are based on one of: hashes of specific instructions and/or checksums of the specific instructions.

20. A non-transitory computer readable medium having stored thereon instructions that cause a processor to execute a method, the method comprising instructions to:

identify a current software tool, wherein the current software tool is used to manage and/or create a current corresponding software;

generate, using a first Artificial Intelligence (AI) algorithm, a current mapping between first code provided to the current software tool and second code of the current corresponding software;

select a learned mapping from among a plurality of learned mappings wherein the generated current mapping and the selected learned mapping are based on one of: hashes of specific instructions and/or checksums of the specific instructions;

compare the generated current mapping to the selected learned mapping to determine if the current software tool is manipulating, by the second code, the current corresponding software in an abnormal way, wherein the selected learned mapping is based on historical code input into one or more historical software tools and historical output code of corresponding historical code output from the one or more historical software tools; and in response to determining that the current software tool is manipulating the current corresponding software in the abnormal way, identify the current software tool as being compromised or likely compromised.

\* \* \* \* \*